US007421440B2

(12) United States Patent
Pereira (10) Patent No.: US 7,421,440 B2
(45) Date of Patent: Sep. 2, 2008

(54) METHOD AND SYSTEM FOR IMPORTING DATA

(75) Inventor: Joel Pereira, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 604 days.

(21) Appl. No.: 10/925,181

(22) Filed: Aug. 24, 2004

(65) Prior Publication Data

US 2006/0047717 A1 Mar. 2, 2006

(51) Int. Cl.
*G06F 7/00* (2006.01)
(52) U.S. Cl. .......................... 707/101; 707/1; 707/100; 709/201
(58) Field of Classification Search ................ 707/101, 707/1, 100; 709/201
See application file for complete search history.

(56) References Cited

U.S. PATENT DOCUMENTS

| 5,832,272 | A | * | 11/1998 | Kalantery | 717/149 |
|---|---|---|---|---|---|
| 7,107,283 | B2 | * | 9/2006 | Seifi | 707/103 R |
| 2002/0111935 | A1 | * | 8/2002 | Jones et al. | 707/1 |
| 2003/0101194 | A1 | * | 5/2003 | Rys et al. | 707/101 |
| 2003/0163671 | A1 | * | 8/2003 | Gschwind et al. | 712/214 |
| 2003/0188065 | A1 | * | 10/2003 | Golla et al. | 710/243 |

OTHER PUBLICATIONS

Cooperman, G. et al., "Scalable Parallel Coset Enumeration Using Bulk Definition", *International Conference on Symbolic and Algebraic Computation, Proceedings of the 2001 International Symposium on Symbolic and Algebraic Computation*, 2001, 77-84.

Eberle, H et al., "Separated High-bandwidth and Low-Latency Communication in the Cluster Interconnect Clint", *Conference on High Performance Networking and Computing, Proceedings of the 2002 ACM/IEEE Conference on Supercomputing*, 2002, 1-12.

Fredman, M.L. et al., "Fibonacci Heaps and Their Uses in Improved Network Optimization Algorithms", *Journal of the ACM (JACM)*, 1987, 34(3), 596-615.

Kane, B. et al., "Consistently Updating XML Documents Using Incremental Constraint Check Queries", *Workshop on Web Information and Data Management, Proceedings of the 4th International Workshop on Web Information and Data Management*, 2002, 1-8.

Scheuermann, P. et al., "Data Partitioning and Load Balancing in Parallel Disk Systems", *The VLDB Journal-The International Journal on Very large Data Bases*, 1998, 7(1), 48-66.

* cited by examiner

*Primary Examiner*—Tim Vo
*Assistant Examiner*—Mahesh H Dwivedi
(74) *Attorney, Agent, or Firm*—Woodcock Washburn LLP (57) ABSTRACT

A method of transferring batches of data to a target database includes receiving ordered rows of data and loading the ordered rows into batch tables. Each batch table being either a parent table, a child table or a no dependency table. The parent batch tables and no dependency batch tables are entered into a ready queue and the child batch tables are entered into a into a waiting pool. Any batch table in the ready queue may be transferred to the database using one or more processors. Any child batch table is moved to the ready queue if no corresponding parent table is in the ready queue. A dependency count of a child table is maintained and decremented if a parent table is imported to a database. In one embodiment, the corresponding child table in the waiting pool is transferred to the ready queue if the dependency count is zero.

19 Claims, 7 Drawing Sheets

Prior Art

METHOD AND SYSTEM FOR IMPORTING DATA

FIELD OF THE INVENTION

This invention relates in general to the field of database computing. More particularly, this invention relates to an efficient transfer between a batch table cache and a target database.

BACKGROUND OF THE INVENTION

Due to the innumerable active systems running in a enterprise environment, data movements such as exporting and importing operations became very frequent. The frequency of these operations tends to be constant but the amount of data involved tends to grow over time. Therefore, being able to import data to a database in the least time possible is often a very important matter for many IT departments; it could mean a better availability for a mission critical application.

There are many different options for bulk data loading into a database. In a Microsoft® SQL Server® computer environment available from Microsoft Corporation in Redmond, Wash., one could use BCP command line, a T-SQL bulk insert, the OLE database products DB IRowsetFastLoad interface or other variations known in the art. A common attribute of all these options is that they handle only a single table operation. The bottleneck in the loading operation is that the database management functions are engulfed in tasks to keep the database receiving the data. Usually the client side is reasonably fast because its tasks are reading and converting the data from the input file and transmitting the data to the server. Once the data is in the server, being appended to the database table, the client side may process another chunk of data, but it will not submit it until it receives an answer about the first data submitted.

Figure 1:
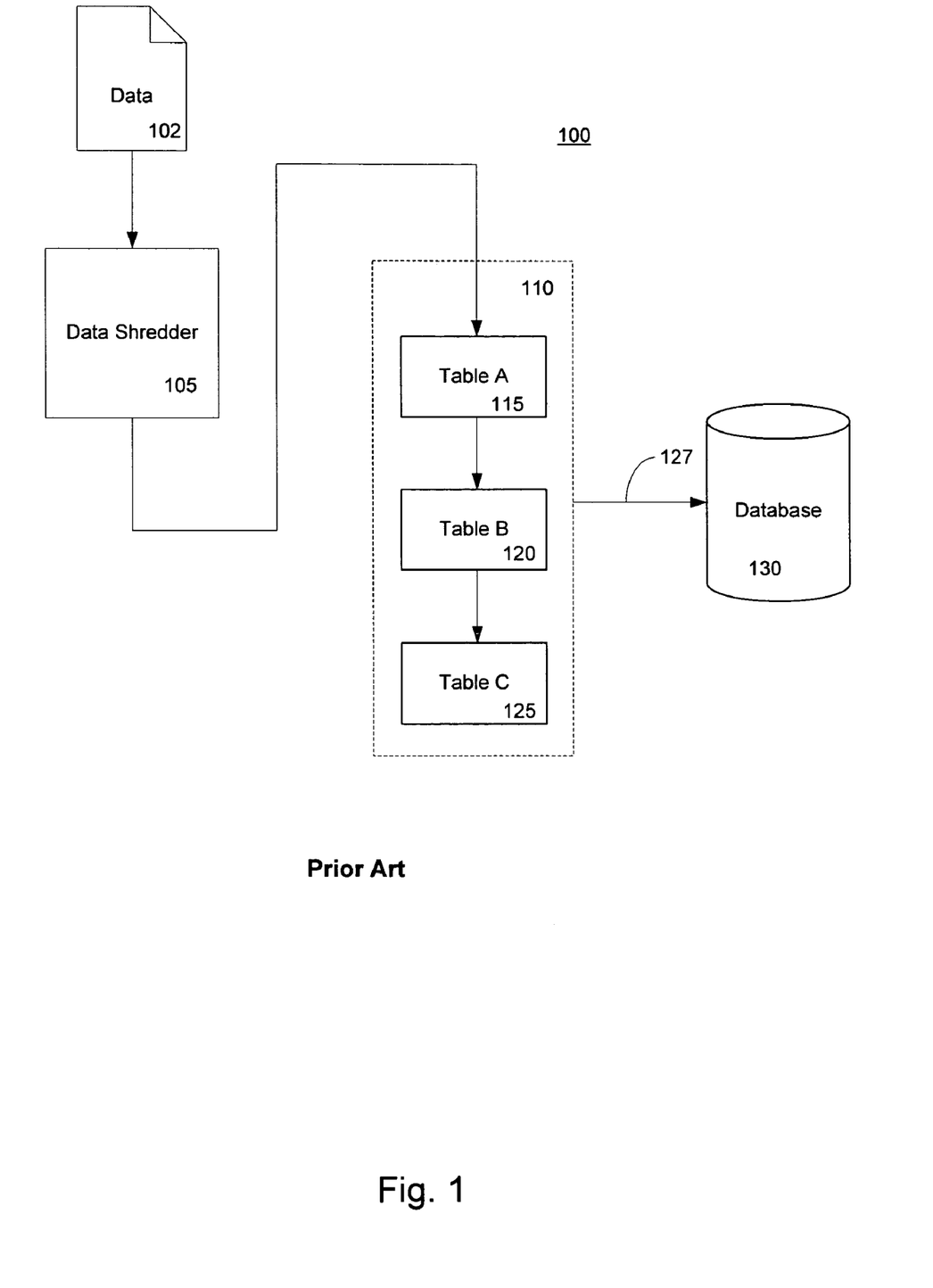
FIG. 1 is a block diagram of an exemplary prior art system for loading data into a database.

FIG. 1 is a depiction of a prior art system 100 for transferring data into a database. The input data 102 can be in any electronic form such as a spreadsheet, comma separated value, text or a markup language such as XML. The data format is assumed compatible with a data shredder 105 which accepts the data 102 and converts it to rows of data. The data shredder 105 operates on the principle that a basic structure in the data 102 can be utilized or derived such that the data may be formatted into rows suitable for table insertion. For example, the input data 102 may be XML data and the data shredder 105 may use the explicit structure of XML to develop a dependency graph upon which the XML data can be segregated into tables. Typically, any one table may have a dependency on another table such that one table exhibits a parent relation to another table which exhibits a child relationship. Some other tables may exhibit no dependency on another table and may therefore be either independent or may represent a different dependency.

The data shredder 105 can produce row data in a format that allows a cache 110 to form distinct tables representing the row data. For example Table A, 115, may represent a parent table from row data received for the data shredder 105. Table B, 120 may represent child table data related to Table A. Table C, 125 may represent row data from the data shredder 105 that is a child of Table B. Since the row data generally is provided in a hierarchal form with parent data first, Table A, being a parent data table may be filled first followed by Tables B and C respectively. Once loaded, these tables are in a form for transfer to the database 130.

Prior art transfers from the cache organizer 110 to a database 130 are generally performed in a serial manner. Table A would be transferred first followed by Table B and then Table C in order to satisfy the need for the database to generate appropriate indexes and other hierarchical structures for the database. The process is also typically serial because only one processor typically handles the transfer of the Tables and the tables are filled completely and then transferred over to the data base in serial generation order.

It is well known that the bandwidth of a serial interface 127 from the cache 110 to the database 130 can be greater than the processing speed of the cache organizer 110 itself. Consequently, the database 130 could, in theory, be loaded much faster if the cache organizer 110 could more quickly produce data for the database. However, the single processor serial transfer mechanism of the prior art limits the speed at which tables destined for the data are made available. Even in multiprocessor environments, it is typically the responsibility of a single processor to manage the transfer of tabular data to a database.

Thus, there is a need for a technique which can perform a time and resource efficient transfer of tabular data to a target database. In particular, it would be useful if the technique could make use of a multiprocessor environment. The present invention addresses the aforementioned needs and solves them with additional advantages as expressed herein.

SUMMARY OF THE INVENTION

An embodiment of the invention includes a method for importing data from a source to a target in a resource and time efficient manner. Data that is to be imported to a target database may be stored in multiple dependent tables. One embodiment of the invention can load multiple tables at the same time resulting in a shorter operation time.

Initially, a prior art mechanism generates the ordered rows to be imported. These rows are received and batched in an appropriate order based on the dependency of the tables involved in the operation. The rows are cached and processed as batches in the right order. The order may be maintained by a graph of batch dependency and what batches are ready to be inserted into a database. The batches that are ready to be imported to the database are transferred to the database using multiple threads so that multiple processors can conduct the transport simultaneously. One embodiment uses multiple batches in a ready queue awaiting importation. Since multiple batches could be ready at any given time, a multiple processed environment can take full advantage of those resources and import batches concurrently.

In one embodiment, a priority queue may be used to designate some batches as higher priority than others based on the number of child tables dependent on rows in the parent such that after the parent is transferred to the database, the children may then be loaded into a ready queue thus providing the ready queue with a broad number of tables to be imported.

BRIEF DESCRIPTION OF THE DRAWINGS

The foregoing summary, as well as the following detailed description of exemplary embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Embodiments of the Invention

Figure 2:
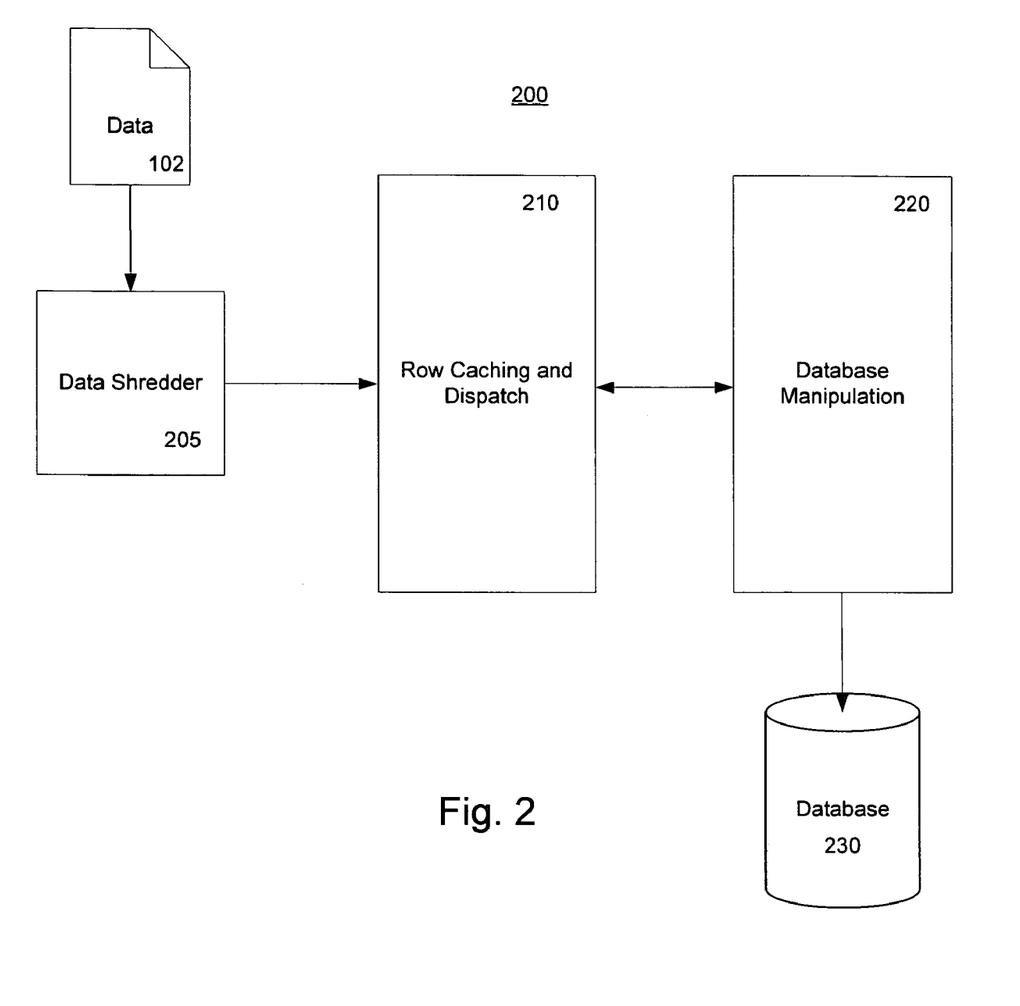
FIG. 2 is a block diagram of a system involving aspects of the invention.

FIG. 2 is a depiction of a system 200 for transferring tabular data to a target database. As described above, typical input data 102 is provided to a data shredder 205. The data shredder performs the task of providing ordered rows of data at the shredder output. This function is well known in the art and the output rows may representing a structure of the input data. As an aspect of the invention, the ordered rows from the shredder 205 are input to a row caching and dispatch function 210 that serves to form the rows into batch tables.

The row caching and dispatch component 210 is responsible for caching and processing the batches tables in the right order. This row caching and dispatch function 210 maintains a structure, for example, a graph, of the batch table dependency and what batch tables are ready to be provided as an output. The row caching and dispatch 210 also controls the number of concurrent sessions opened against the target database and the number of threads processing the batches. As a result, batch tables can be efficiently imported to the database 230 via the database manipulation functionality 220.

The database manipulation component 220 is responsible for performing the import operation using a fast database transfer technique. This component receives a batch of rows to be imported and performs the transfer operation. After importing the batch, the dependency graph is updated and more batches become ready to be imported. Because multiple batches could be ready at any given time, a multiple processed environment can take advantage of the multiple batch tables available and import batches concurrently to the database 230.

Figure 3:
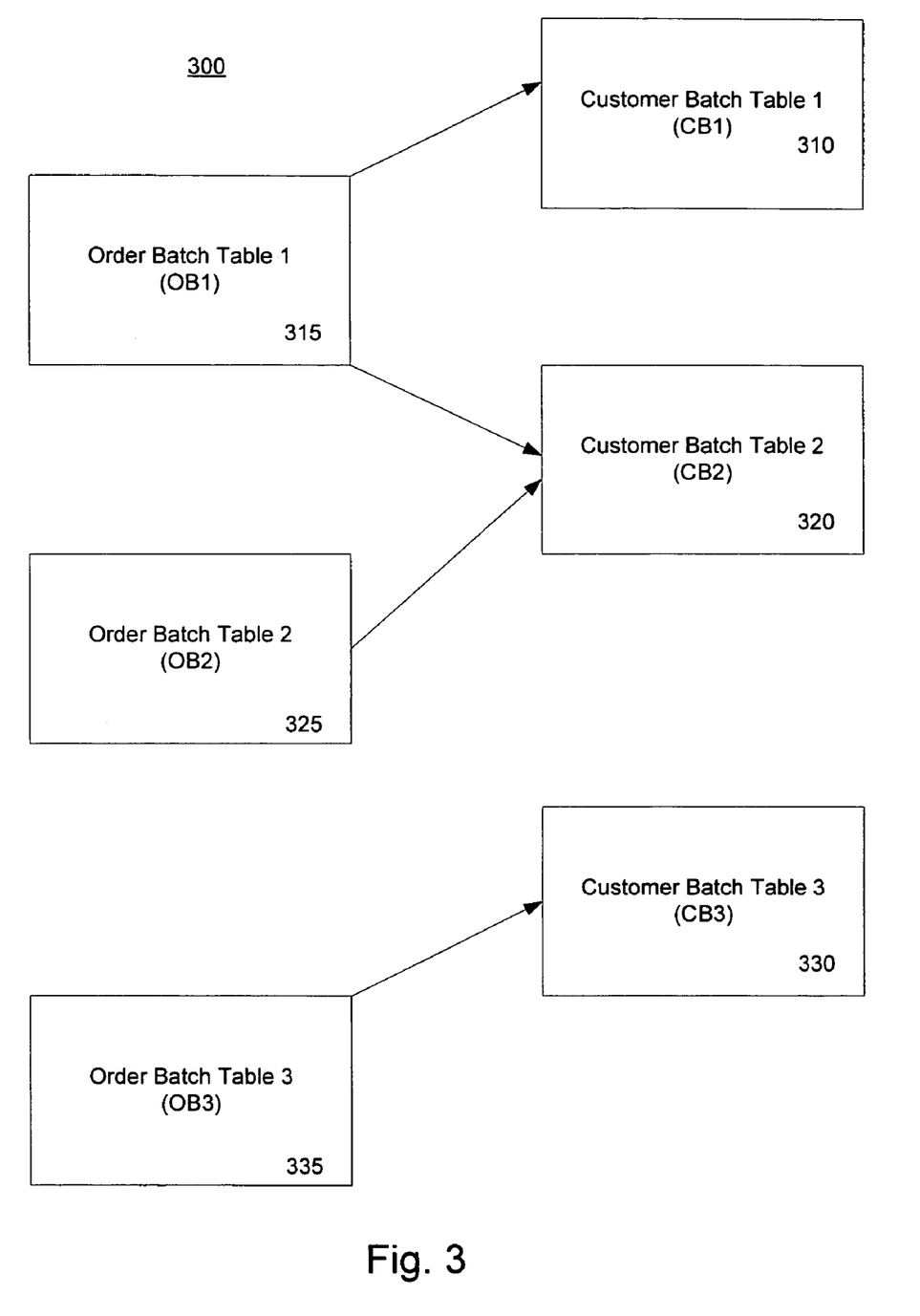
FIG. 3 is a block diagram showing the caching aspect of the invention.

The row caching and dispatch component 210 manages the resource utilization during the load process. Its responsibilities include managing the memory utilization, transaction control, multithread synchronization and task flow control. FIG. 3 is an example of a manner in which cache tables may be assembled according to an aspect of the invention. As described above ordered rows are input into the row caching and dispatch function 210. Those rows correspond to a structure of the input data 102. According to an aspect of the invention, the rows can be organized in cache batches and represent tables or parts of tables that reflect the structured organization of the input data. For example, if the input data 102 is XML, the structure may be a dependency graph or node tree. The row caching and dispatch component can take the ordered rows and generate cache batches. For example, if the row data indicates that there is a parent grouping called customer and a child grouping called order, then the table batches could be generated as shown in the example depiction 300 of FIG. 3. There the customer batch 1 (CB1), 310, can be a parent table for order batch table 1 (OB1), 315 and a dependency exists between them. Likewise assume that order batch 1 (OB1) is also a child to a parent customer batch table 2 (CB2), 320. There is then a dependency between order batch table 1 (OB1), 315, and customer batch table 2 (CB2), 320. Another parent/child dependency relationship may also exist between order batch table 2 (OB2), 325 and customer batch table 2 (CB2), 320. All tables may not be linked to all other tables as customer batch table 3 (CB3), 330 is parent to child order batch table 3 (OB3), 335, but not related to parent tables CB1, 310 or CB2, 320.

In an aspect of the invention, as soon as a parent table, such as CB1, is available for transfer, it can be transferred to a database. However, a child table such as OB2, 325 cannot be transferred until after it's parent CB2, 320 has been transferred to the database. Thus, in FIG. 3, the transfer priority is parent and then child. Thus, CB1 and CB2 are transferred before OB1 and OB2. Note that OB1 cannot be transferred until both CB1 and CB2 are transferred because of the OB1 child dependency on CB1 and CB2.

In another aspect of the invention, if both CB1 and CB2 were roughly simultaneously available, then CB2 may be transferred first because it has two child dependencies; OB1 and OB2 as opposed to the only one child dependency that CB1 represents. The concept in this priority is that if transfers could be performed simultaneously, then transfers could be prioritized to provide the maximum number of child tables to be transferred. For example, by transferring CB2 out to a database in preference to CB1, then two tables, OB2 and OB1 are potentially available for transfer. In the example of FIG. 3, OB2 is actually ready to be transferred.

In a system that provides multiple transfer simultaneously, CB1, CB2, and CB# could be transferred simultaneously, thus allowing the transfer of all of the child tables OB1, OB2, and OB3 shortly thereafter. However, if a question arose as to which parent table to discharge to a database next where resources allowed only one parent file to be transferred, then the table with the highest number of total dependencies would be chosen. These availability principles are used as aspects of the implementation for the row and caching and dispatch component 210 of the present invention.

In one embodiment, a user can specify control the operation of the bulk loader invention and regulate how much memory is used during bulk loading operations by setting a client buffer size property. This property is expressed in number of rows and is used as a guideline since there is no way to make sure that the bulk load will be able to accomplish the number of rows defined. For example, assume two tables need to loaded which have a relationship between them, such that a row for table A must be inserted before a row in table B. If the row order in the input data, for example XML input data, happens to be first row B and then row A, it is preferable for an XML bulk load to cache row B, insert row A and then insert row B. In this simple case if the user specifies a client buffer size to be equal to 1, meaning cache just one row at a time, a deadlock would occur. Thus, it is preferable that a user select enough cache to allow for a meaningful batch size.

Figure 4:
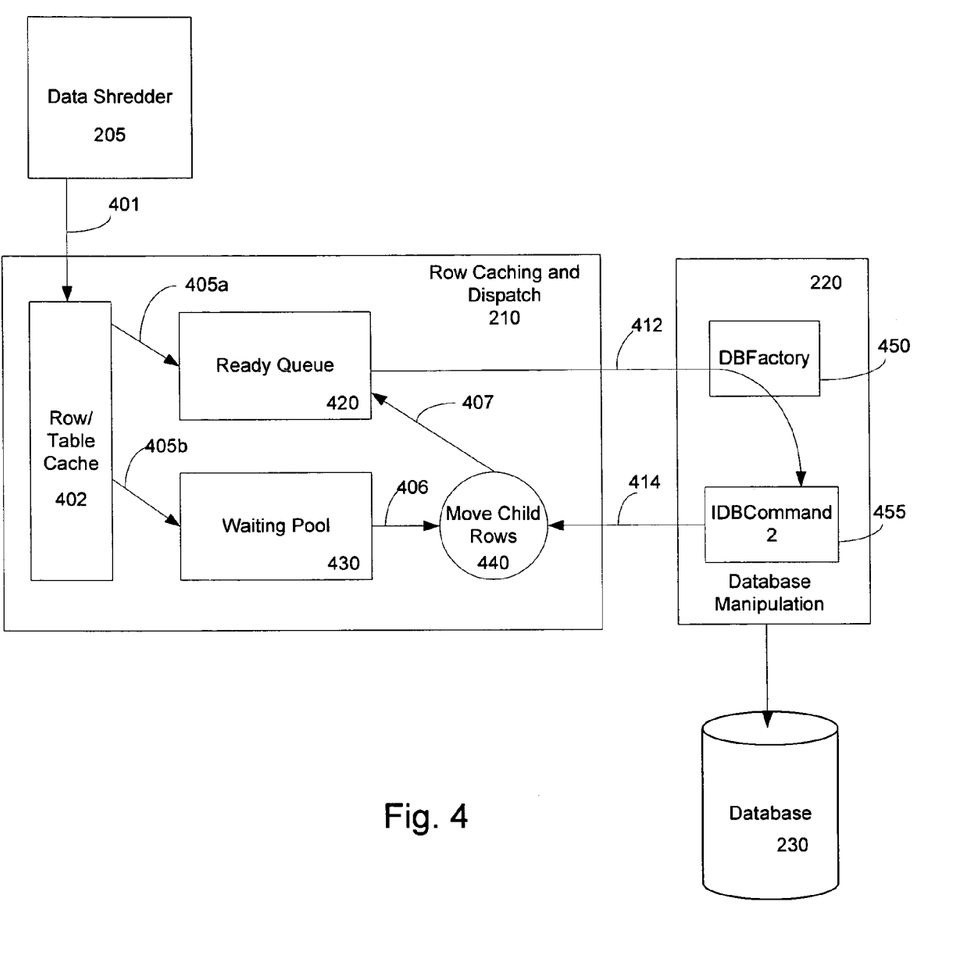
FIG. 4 is a block diagram of an embodiment showing details of the row caching aspect of the invention.

FIG. 4 depicts an exemplary implementation of the row caching and dispatch 210 component. This component is dedicated to manage how much caching space is used during bulk loading operations, performing the transaction management and encapsulating as much as possible of the multithreading complexity. The function includes a row/table cache 402, ready queue 420, a waiting pool 430 and various interfaces. As previously discussed, a data shredder 205 provides ordered row data to the row caching and dispatch function 210. This ordered row data 401 is collected into cached sets of rows or cached tables and is directed, via path 405a, according to the hierarchical information of the data to either the ready queue 420 or it is directed, via path 405*b*, to a waiting pool 430 based on the status of the parent rows. If the rows or tables based on parent rows are processed into batches, then the generated row is added to the ready queue 420, otherwise it goes to the waiting pool 430. Some rows, with no dependency restrictions are also directed to the ready queue 420.

In an aspect of the invention, based on the total count of rows stored in the waiting pool 430 and ready queue 420, the component performing the row generation tasks 205 may be blocked or suspended, while another thread is processing the batch tables in the ready queue 430. This is the mechanism used to keep the memory utilization around user defined limits if necessary.

As previously described, when rows forming a batch are in the ready queue 420, the batch is made available for import to the database 230. This is performed by informing the database manipulation 220 component via link 412 that a ready cache is available. The database manipulation 220 component can interface with available processors to allow a software thread to transport the ready cached table to the database. Eventually, the row is inserted into the destination table and it can be marked as processed. When processed, the database manipulation feedback 414 informs the move child rows function 440 to move child rows from the waiting pool 430 to the ready queue 420 if the child to be moved has no parent table in the ready queue 430. That is, when a batch table is transferred to the database, all its children are updated and those child cached tables that have all parent cached tables or rows marked as processed will be removed from the waiting pool 430 and pushed 407 to the ready queue 420.

The database manipulation component 220 is responsible for performing database commands. The bulk data load process can be simple as loading data into a single database table, or more complex as loading data into multiple tables with many dependencies among them. The database manipulation component 220 receives a row and can determine the database command to create. In one embodiment, the database command is an object that implements IDbCommand2 interface, defined below in C# language. The IDbCommand interface, part of a Microsoft .Net® Framework 1.0, is included as well.

```
public interface IDbCommand : IDisposable
{
    IDbConnection Connection {get; set;}
    IDbTransaction Transaction {get; set;}
    string CommandText {get; set;}
    int CommandTimeout {get; set;}
    CommandType CommandType {get; set;}
    IDataParameterCollection Parameters {get;}
    void Prepare( );
    UpdateRowSource UpdatedRowSource {get;set;}
    void Cancel( );
    IDbDataParameter CreateParameter( );
    int ExecuteNonQuery( );
    IDataReader ExecuteReader( );
    IDataReader ExecuteReader(CommandBehavior behavior);
    object ExecuteScalar( );
}
internal interface IDbCommand2 : IDbCommand
{
    void PrepareCommit( );
    void PrepareRollback( );
}
```

In some situations, to perform a database command, it is preferable to execute some custom code before submitting the commit transaction command.

Referring to FIG. 4, in one embodiment, the database manipulation function 220 may function to transfer an XML batch of rows or table from the ready queue 420 to a SQL database. Interface link 412 can make available a row or table batch and ask for a database command via the DBCommand-Factory 450 in order to transfer the ready queue batch to the database 230. The DBCommandFactory 450 may create a new database command or use an already existing instance of a command based on the bulk data load request settings defined by the user. The request settings are all the public properties exposed by the bulk data load class as well as the SQL connection and XML data. For instance, the public property UpdateOnExisting equals true, activates the update/insert (upsert) behavior, so that when the DBCommandFactory needs to create a database command, it will return the object that knows how to implement the upsert behavior.

DBCommandFactory 450 is the element that allows an extension of the bulk data load features that relate exclusively to the database manipulation without affecting other components because it encapsulates the logic of deciding which database command to use for each individual table. After determining the appropriate database command to use, DBCommandFactory 450 returns an object that implements the IDbCommand2 455 or IDBCommand interfaces. As indicated before, feedback link 414 can provide information as to the status of the transferred batch so that child rows can be moved 440 from the waiting pool 430 to the ready queue 420 if appropriate.

In an aspect of the invention, the ready queue 420 implements a priority queue based on the number of children cached. In other words, the greater number of children depending on a cached parent table, the higher the priority should be given to the patent cached table. For example, given a cached parent table or row set has 5 children and another cached parent table or row set has 15 children, the ready queue 420 should first transfer the cache with 15 children and then the cache with 5 children. The reason underlying this behavior is to maximize the number of cached items in the waiting pool 430 that can be transferred to the ready queue 420 so as to take advantage of the existence of multiple processors and multiple threads for transfer to the database 230.

In an aspect of the invention, as soon as the rows or tables are batched in the row/table cache 402 are produced, they are pushed to the corresponding storage container; the waiting pool 430 or ready queue 420. After the row/table batch is produced, a class still keeps a reference to it to be used in the event that children rows might come later on. Because the number of dependent rows can change after a row is pushed to the ready queue 420, the priority queue implementation should preferably support an efficient priority change operation. Specific priority queue implementations are well known in the art.

In one embodiment of the invention, the row caching and dispatch component 210 raises internal events every time N rows have being processed to some level. There can be an internal component that subscribes to these events and in response to them, pushes transaction management tasks to the ready queue. These are the tasks include preparing a commit task to push out a batch to an available processor via the database manipulation component 220 which generates appropriate database commands. Another task includes generating a single commit transaction task. This single task is a special kind of task that requires all threads to be blocked inside the row caching and dispatch component 210 to avoid both deadlocks accessing common data structures and racing conditions.

Figure 5:
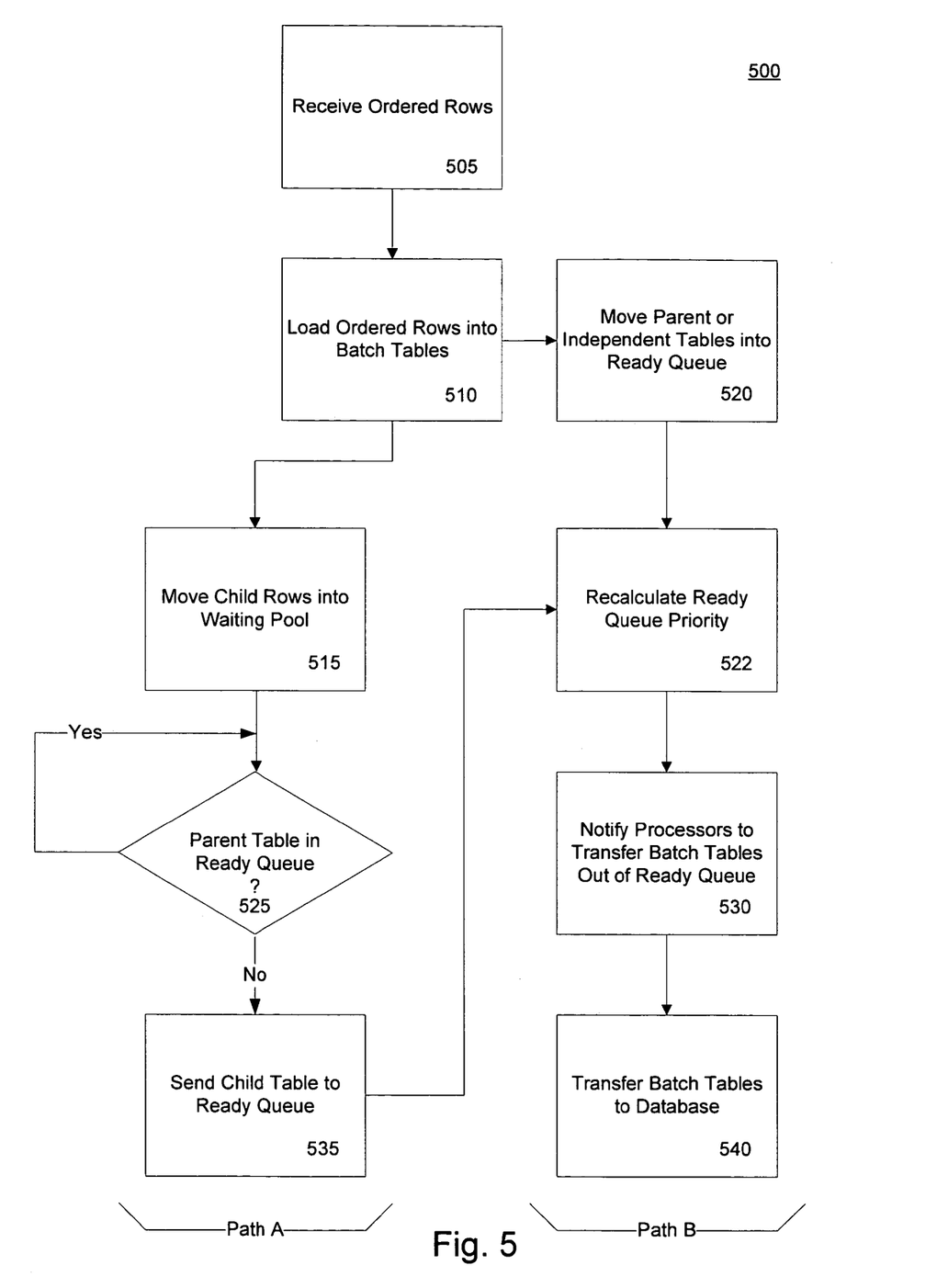
FIG. 5 is a flow diagram of an embodiment of the method of the invention.

FIG. 5 is a flow diagram 500 representing aspects of the invention. In one embodiment, the process begins by receiving ordered rows (step 505). The ordered rows can be from any source. In one embodiment, the ordered rows may be from a data shredder 205 as discussed with respect to FIGS. 2 and 4. However, any source of ordered rows may be used. The ordered rows are loaded into batch containers (step 510). The containers may represent tables that the ordered rows produce when assembled. In one embodiment, the batch containers may be represented as cache memory. After the batch containers, having rows, are filled, the batch containers may be transferred based on the dependency of each batch. For example, if a batch container represents a parent table, then the batch table is entered into a ready queue (step 520). If the batch table represents a child table, then the child table is moved into a waiting pool (step 515). It is notable at this point that the process can nearly simultaneously execute the paths indicated as path A and B in FIG. 5.

Following path B, assuming that a table was assembled (step 510) and moved to the ready queue (step 520), the process 500 notifies one or more processors to transfer the batch tables out of the ready queue (step 530). The computer environment preferably is a multiprocessor environment where more than one processor may be available to respond to the notification to extract a batch table from a ready queue. However, a single processor environment may work as well. Once an available processor responds to the notification that a batch table is available, the responding processor is permitted to transfer the batch table out of the ready queue and into a target database (step 540).

As mention above, both paths A and B of FIG. 5 are occurring nearly simultaneously as the process 500 represents a type of pipeline to transfer cached batch tables out to a database. In path B, a cached set of rows may make up a child table (step 510). Cached child rows or tables are moved into a waiting pool (step 515). There, child rows or tables wait until their respective parent tables are taken out of the ready queue as described with respect to steps 530 and 540. Thus, a functional test of the waiting pool tables is conducted (step 525) to determine if parents of the child batches in the waiting pool are still in the ready queue. If there are parent tables in the ready queue whose children are in the waiting pool, then those children tables remain in the waiting pool to be tested again. However, if there are no parents of the children in the ready queue, then the child table is moved to the ready queue (step 535). Once a child table is entered into the ready queue, A ready queue priority is recalculated (step 522) as discussed above to allow a more efficient construction of data into a target database. Once the ready queue priority is established, the data that is entered into the ready queue is immediately available for notification to an available processor (step 530) and transfer out to the database (step 540).

Figure 6:
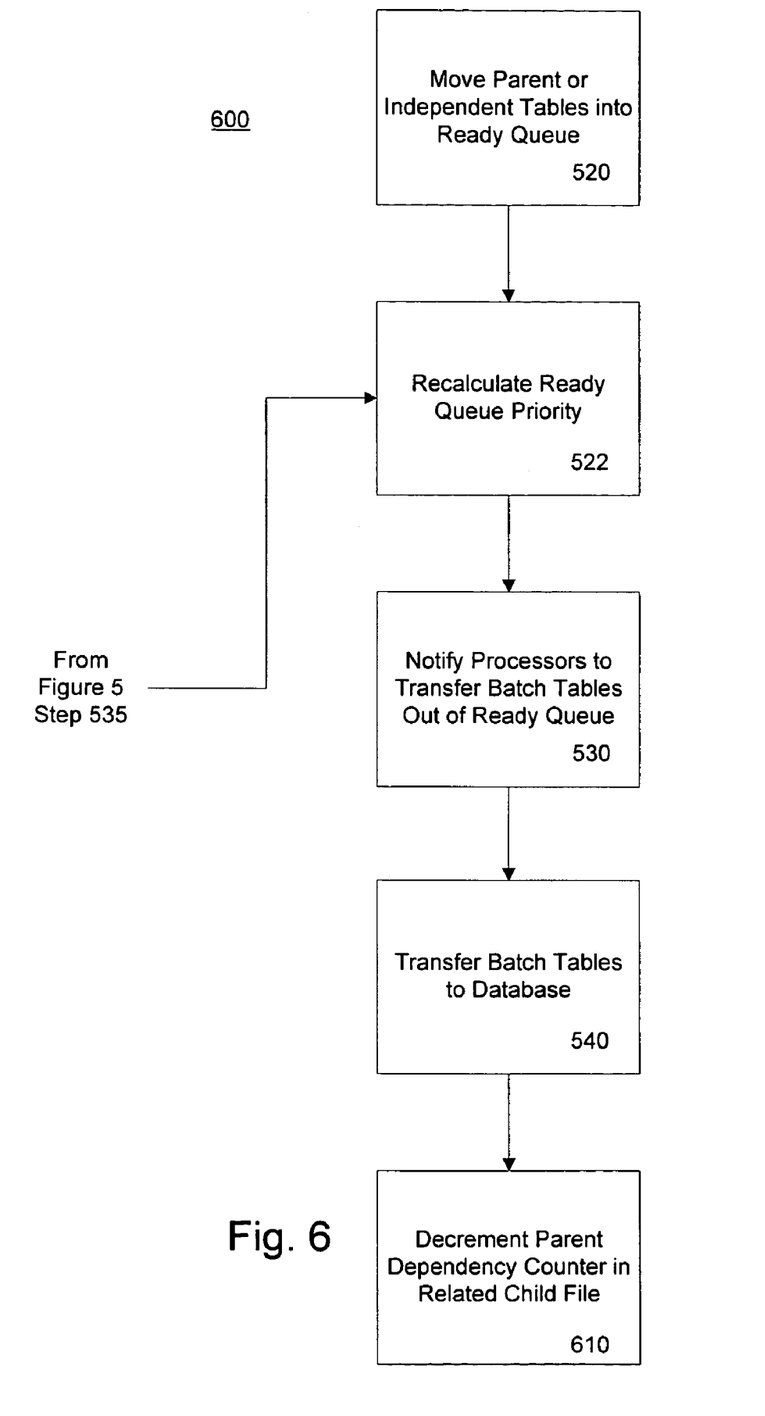
FIG. 6 is an additional flow diagram of an embodiment of an aspect of the invention.

In one embodiment, the test of step 525 is implemented as a test of a control register as indicated in FIG. 6. FIG. 6 is a portion 600 of the FIG. 5 process 500. The steps shown in FIG. 5 are those of the path B of FIG. 5 with the addition of a feedback step. Referring to FIG. 5, upon entering a child row or table into the waiting pool, a dependency counter on the child row or table may be generated such that the dependency counter indicates the total number of parent tables that the specific child depends upon. For example, if a child has three parent tables, then the dependency counter would be set to three.

Referring to FIG. 6, once a parent row or table is moved into the ready queue (step 520), The ready queue priority is recalculated (step 522) and processors in the hosting system are notified that a cache of a parent row or table is available for transfer out to the target database (step 530). An available processor may then transfer the available parent row or table to the target database using appropriate database commands and communications paths (step 540). In one embodiment, the process continues by decrementing the dependency counter associated with a child table in the waiting pool for the specific parent that has just been removed from the ready queue. In this way, as parent tables are transferred out of the ready queue, the respective child tables indicate fewer and fewer parent dependencies in the dependency counter. Eventually, if no more parent tables are present in the ready queue, the dependency counter is zero. Under those conditions, the test of step 525 in FIG. 5 is a check of the dependency counter for a child file. If the dependency counter for a specific table is tested and equals zero, then there are no parent dependencies in the ready queue and the child table can be moved to the read queue as shown and described in FIG. 5 (step 535). Other implementation of the test (step 535) of FIG. 5 are possible and are in accord with an aspect of the invention.

Exemplary Computing Device

Figure 7:
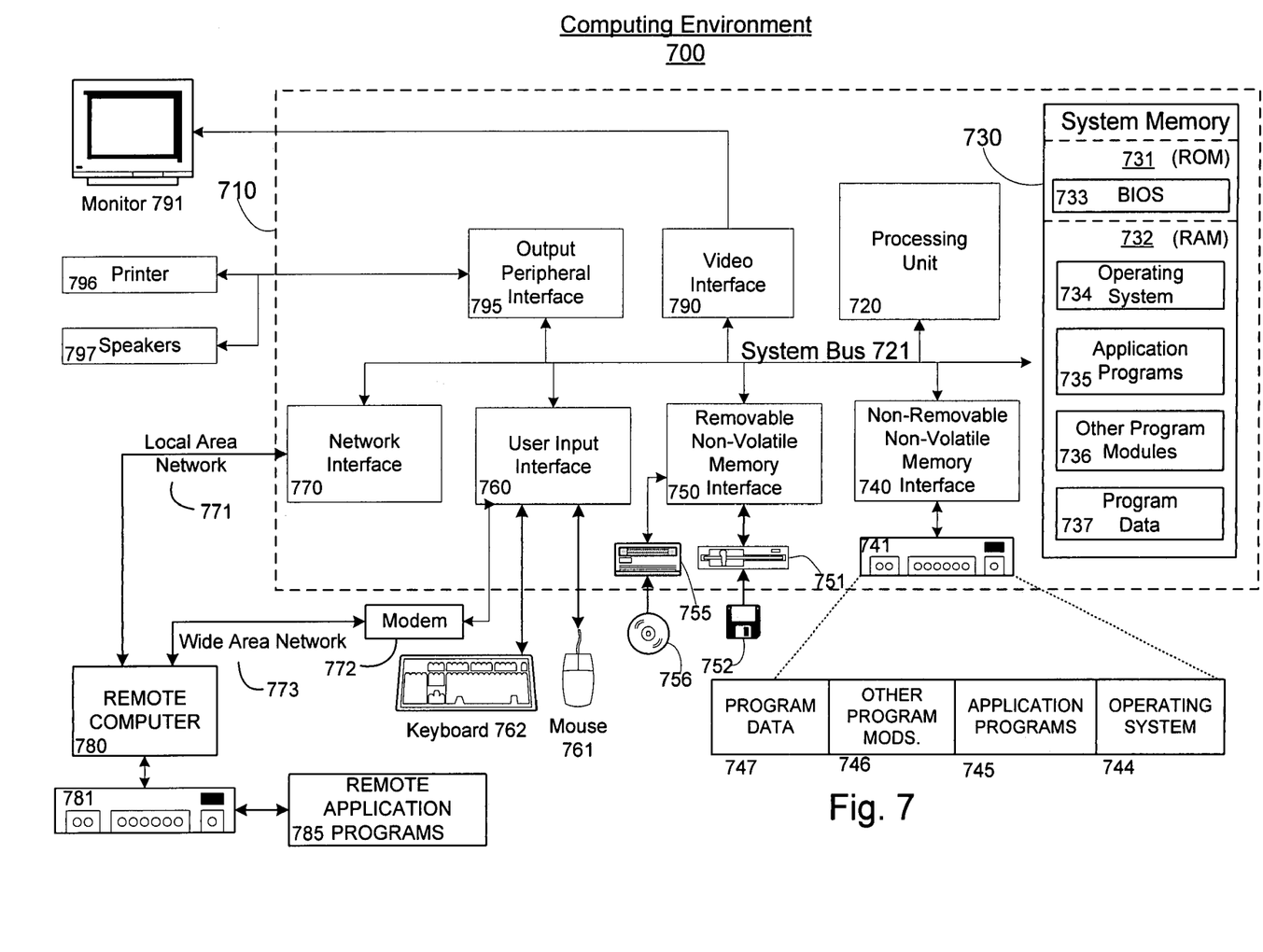
FIG. 7 is a block diagram showing an exemplary computing environment in which aspects of the invention may be implemented.

FIG. 7 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 7 thus illustrates an example of a suitable computing system environment 700 in which the embodiments of the invention may be implemented, although as made clear above, the computing system environment 700 is only one example of a suitable computing environment and is not intended to suggest any limitation as to the scope of use or functionality of an embodiment of the invention. Neither should the computing environment 700 be interpreted as having any dependency or requirement relating to any one or combination of components illustrated in the exemplary operating environment 700.

With reference to FIG. 7, an exemplary system for implementing an embodiment of the invention includes a general purpose computing device in the form of a computer system 710. Components of computer system 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 710 typically includes a variety of computer readable media. Computer readable media can be any available media that can be accessed by computer system 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer system 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer system 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7 provide storage of computer readable instructions, data structures, program modules and other data for the computer system 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer system 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus 721, but may be connected by other interface and bus structures, such as a parallel port, game port or a universal serial bus (USB). A monitor 791 or other type of display device is also connected to the system bus 721 via an interface, such as a video interface 790, which may in turn communicate with video memory (not shown). In addition to monitor 791, computer systems may also include other peripheral output devices such as speakers 797 and printer 796, which may be connected through an output peripheral interface 795.

The computer system 710 may operate in a networked or distributed environment using logical connections to one or more remote computers, such as a remote computer 780. The remote computer 780 may be a personal computer, a server, a router, a network PC, a peer device or other common network node, and typically includes many or all of the elements described above relative to the computer system 710, although only a memory storage device 781 has been illustrated in FIG. 7. The logical connections depicted in FIG. 7 include a local area network (LAN) 771 and a wide area network (WAN) 773, but may also include other networks/buses. Such networking environments are commonplace in homes, offices, enterprise-wide computer networks, intranets and the Internet.

When used in a LAN networking environment, the computer system 710 is connected to the LAN 771 through a network interface or adapter 770. When used in a WAN networking environment, the computer system 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer system 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a bulk transfer mechanism of information to a database. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method of transferring batches of data to a target database in an environment of multiple processors, the method comprising:

receiving ordered rows for insertion into a database;

loading the ordered rows into batch tables located in cache, the batch tables organized as parent tables, child tables, and tables without a dependency;

entering the parent batch tables and the tables without a dependency into a ready queue;

entering the child batch tables into a waiting pool;

queuing the parent batch tables and the tables without a dependency in the ready queue for transfer to the database;

notifying an available processor among the multiple processors that tables in the ready queue are ready for transfer;

transferring the parent batch tables and the tables without a dependency in the ready queue to the database;

moving the child batch tables from the waiting pool to the ready queue when the child batch tables in the waiting pool have no corresponding parent present in the ready queue;

transferring the child batch tables from the ready queue to the database, wherein any batch table moved to the ready queue is available for transfer to the database;

wherein transferring the parent batch tables and the child batch tables in the ready queue comprises simultaneously transferring at least two batch tables to the database using multiple processors and multiple threads, and wherein the transfer of the parent batch tables and the transfer of the child batch tables is accomplished using a database manipulator that encapsulates the logic of deciding which database command to use for each individual table, and wherein the database manipulator provides feedback concerning a status of a transferred batch table such that the child batch tables are moved from the waiting pool to the ready queue during a transfer.

2. The method of claim 1, wherein receiving ordered rows for insertion into a database comprises receiving ordered rows wherein the order represents a sequence to load rows into tables according to a dependency graph.

3. The method of claim 1, wherein queuing batch tables in the ready queue for transfer to the database comprises notifying at least one processor that tables in the ready queue are available for transfer to the database.

4. The method of claim 3, wherein the ready queue provides a higher transfer priority to batch tables having a greater number of batch table dependencies than to batch tables having a lower number of batch table dependencies.

5. The method of claim 1, wherein the steps are performed iteratively to continuously transfer batches of stripped XML row data from an XML source to a target database.

6. A method of transferring batches of data to a target database in an environment of multiple processors, the method comprising:
   receiving ordered rows of XML data for insertion into a database;
   loading the ordered rows into batch tables, the batch tables organized as parent tables, child tables, and tables without a dependency;
   entering the parent batch tables and the tables without a dependency into a ready queue;
   entering the child batch tables into a waiting pool;
   queuing any batch table in the ready queue for transfer to the database;
   notifying an available processor among the multiple processors that tables in the ready queue are ready for transfer;
   transferring queued batch tables in the ready queue to the database;
   decrementing a dependency count of a child batch table in the waiting pool if a corresponding parent batch table has been moved out of the ready queue, wherein the dependency count indicates the number of corresponding parent batch tables present in the ready queue;
   moving a child batch table from the waiting pool to the ready queue if the corresponding dependency counter is zero;
   transferring any batch table in the ready queue to the database whereby the received ordered rows of XML data are inserted into a database; and
   wherein transferring any batch table in the ready queue comprises simultaneously transferring at least two batch tables to the database using multiple processors and multiple threads, and wherein the transfer of any batch table is accomplished using a database manipulator that encapsulates the logic of deciding which database command to use for each individual table, and wherein the database manipulator provides feedback concerning a status of a transferred batch table such that child batch tables are moved from the waiting pool to the ready queue during a transfer.

7. The method of claim 6, wherein queuing any batch table in the ready queue for transfer to the database comprises notifying at least one processor that tables in the ready queue are available for transfer to the database.

8. The method of claim 7, wherein the ready queue provides a higher transfer priority to batch tables having a greater number of batch table dependencies than to batch tables having a lower number of batch table dependencies.

9. The method of claim 6, wherein the steps are performed iteratively to continuously transfer batches of stripped XML row data from an XML source to a target database.

10. A system for transferring batches of data to a target database in an environment of multiple processors, the system comprising:
    at least one processor having access to memory, including cache, the memory having instructions which, when executed, perform the method comprising:
      receiving ordered rows for insertion into a database;
      loading the ordered rows into batch tables located in the cache, the batch tables organized as parent tables, child tables, and tables without a dependency with respect to other batch tables located in the cache;
      entering the parent batch tables and the tables without a dependency into a ready queue;
      entering the child batch tables into a waiting pool;
      queuing batch tables in the ready queue for transfer to the database;
      notifying an available processor among the multiple processors that tables in the ready queue are ready for transfer;
      transferring queued batch tables in the ready queue to the database; and
      moving child batch tables from the waiting pool to the ready queue, the move triggered using means for determining if a child batch table is transferable to the database, wherein all batch tables entered into the ready queue are transferred to the database and wherein the received ordered rows are inserted into the database; and
    a database manipulator that provides feedback concerning a status of a transferred batch table such that the child batch tables are moved from the waiting pool to the ready queue during a transfer to the multiple processors, the database manipulator generating database commands for each individual table and effecting the transfer of the queued batch tables and the movement of the child batch tables.

11. The system of claim 10, wherein the at least one processor is notified when a batch table is entered into the ready queue.

12. The system of claim 10, wherein the ready queue provides a higher transfer priority to batch tables having a greater number of batch table dependencies than to batch tables having a lower number of batch table dependencies.

13. The system of claim 10, wherein the method steps are performed iteratively to continuously transfer batches of stripped XML row data from an XML source to the target database.

14. The system of claim 10, wherein means for determining if a child batch table is transferable to the database comprises a dependency counter, wherein the dependency counter indicates the number of parent batch tables present in cache and wherein the child batch table is transferable when the dependency counter is zero.

15. A computer-readable storage medium having computer-executable instructions for performing a method for transferring batches of data to a target database in an environment of multiple processors, the instructions, when executed, performing steps comprising:
    receiving ordered rows for insertion into a database;
    loading the ordered rows into batch tables located in cache, the batch tables organized as parent tables, child tables, and tables without a dependency with respect to other batch tables located in the cache;
    entering the parent batch tables and no dependency batch tables into a ready queue;
    entering the child batch tables into a waiting pool;
    queuing batch tables in the ready queue for transfer to the database;

notifying an available processor among the multiple processors that the batch tables in the ready queue are ready for transfer;

transferring queued batch tables in the ready queue to the database;

moving the child batch tables from the waiting pool to the ready queue if the child batch tables in the waiting pool have no corresponding parent present in the ready queue;

wherein batch tables moved to the ready queue are available for transfer to the database;

transferring all the batch tables to the database, wherein batch table information in the database is accessed for display; and wherein transferring the parent batch tables and the child batch tables in the ready queue comprises simultaneously transferring at least two batch tables to the database using multiple processors and multiple threads, and wherein the transfer of the parent batch tables and the transfer of the child batch tables is accomplished using a database manipulator that encapsulates the logic of deciding which database command to use for each individual table, and wherein the database manipulator provides feedback concerning a status of a transferred batch table such that the child batch tables are moved from the waiting pool to the ready queue during a transfer.

16. The computer-readable storage medium of claim 15, wherein the step of queuing batch tables in the ready queue for transfer to the database comprises notifying at least one processor that tables in the ready queue are available for transfer to the database.

17. The computer-readable storage medium of claim 15, wherein the steps of are performed iteratively to continuously transfer batches of stripped XML row data from an XML source to a target database.

18. A computer-readable storage medium having computer-executable instructions for performing a method for transferring batches of data to a target database in an environment of multiple processors, the instructions, when executed, performing the steps comprising:

receiving ordered rows of XML data for insertion into a database;

loading the ordered rows into batch tables, the batch tables organized as parent tables, child tables, and tables without a dependency;

entering parent batch tables and no dependency batch tables into a ready queue;

entering the child batch tables into a waiting pool;

queuing any batch table in the ready queue for transfer to the database;

notifying an available processor among the multiple processors that the batch tables in the ready queue are ready for transfer decrementing a dependency count of a child batch table in the waiting pool if a corresponding parent batch table has been moved out of the ready queue, wherein the dependency count indicates the number of corresponding parent batch tables present in the ready queue;

moving a child batch table from the waiting pool to the ready queue if the corresponding dependency counter is zero;

transferring any batch tables in the ready queue to the database, wherein batch table information in the database is accessed for display; and wherein transferring any batch tables in the ready queue comprises simultaneously transferring at least two batch tables to the database using multiple processors and multiple threads, and wherein the transfer of any batch tables is accomplished using a database manipulator that encapsulates the logic of deciding which database command to use for each individual table, and wherein the database manipulator provides feedback concerning a status of a transferred batch table such that the child batch tables are moved from the waiting pool to the ready queue during a transfer.

19. The computer-readable storage medium of claim 18, wherein the step of queuing any batch table in the ready queue for transfer to the database comprises notifying at least one processor that tables in the ready queue are available for transfer to the database.

* * * * *